Dec. 6, 1960   G. A. LYON   2,963,321
WHEEL COVER
Filed Sept. 20, 1956
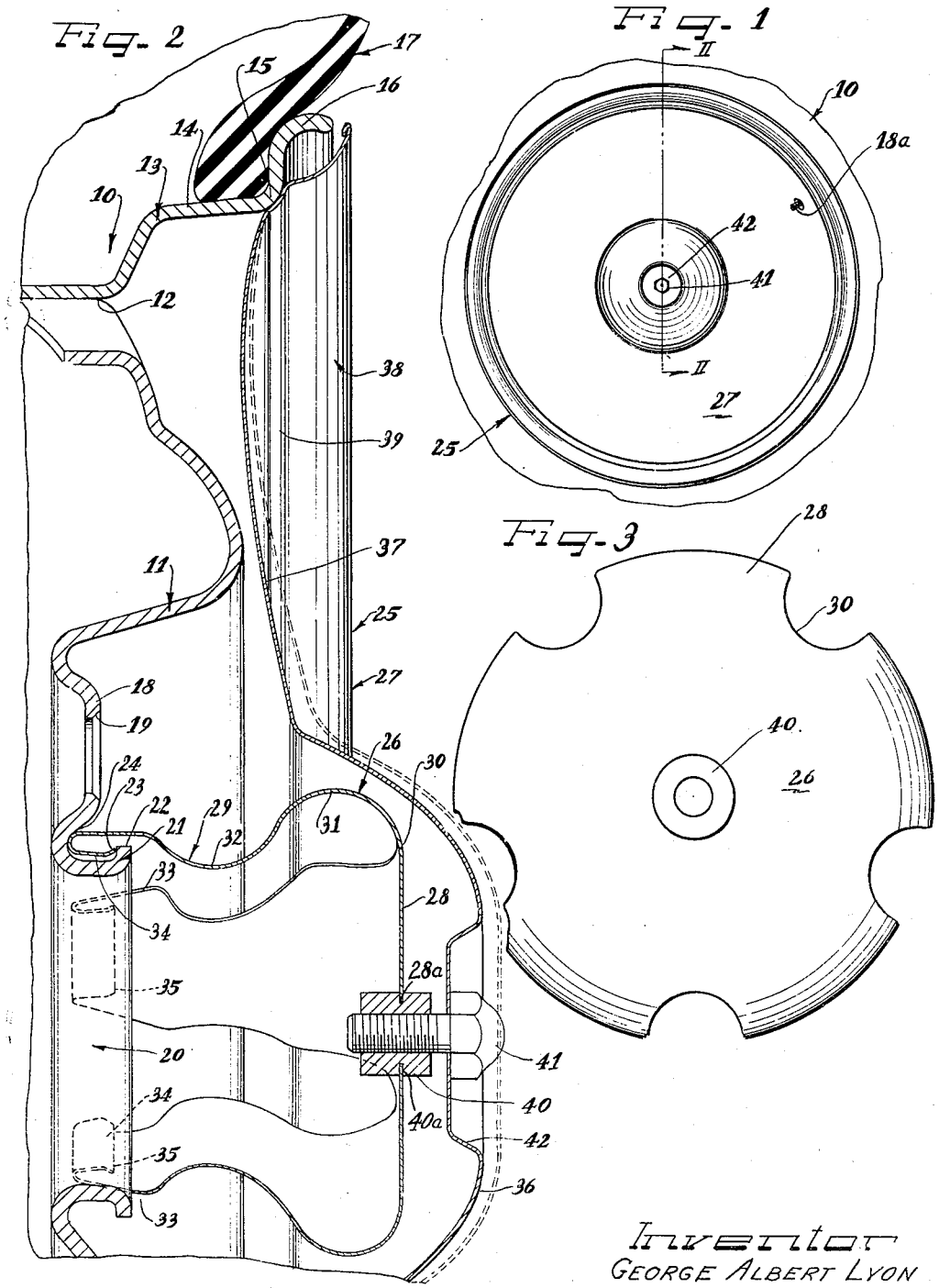
Inventor
GEORGE ALBERT LYON United States Patent Office 2,963,321
Patented Dec. 6, 1960

2,963,321

WHEEL COVER

George Albert Lyon, 13881 W. Chicago Blvd.,
Detroit 28, Mich.

Filed Sept. 20, 1956, Ser. No. 610,938

7 Claims. (Cl. 301—37)

This invention relates generally to wheel structures and more particularly to a wheel cover and a new and improved cooperation between the cover and wheel.

Due to the increase in the size of the wheel covers presently utilized for an automobile vehicle and the like and also due to increased labor costs, the public has become more and more concerned with the losses incurred as a result of thieves stealing the new higher priced wheel covers. The present wheel structure is especially adapted to be equipped with a key operated locked device to lock the cover on the wheel to protect the automobile owner's property.

Accordingly, an object of this invention is to provide a new and improved wheel structure having a multi-part cover construction adapted for detachable overlying assembly on the wheel and which readily lends itself to having a locking device attached to the cover assembly to prevent theft.

Still another object of this invention is to provide a wheel cover assembly which lends itself to economical manufacture on a large production basis.

According to the general features of this invention there is provided in a wheel structure an inner cap like member having resilient extensions in detachable engagement with the body part and an outer cover member overlying and concealing the inner cover member and a substantial portion of the wheel with the inner and outer cover members being connected together by a detachable fastener. When the cover members are in assembly together, the outer cover member is in biased or tensioned engagement with the wheel in such a manner as to prevent the cover assembly from being disassembled from the wheel unless the detachable fastener is disengaged. Accordingly, when a suitable key operated locking device is coordinated with the detachable fastener the cover assembly may not readily be removed from the wheel without breaking the lock or without seriously damaging the cover assembly.

Yet another features of this invention relates to the manner in which the inner cap like member cooperates with the body part so as not to interfere with the assembly or removal of the entire wheel structure from the vehicle, and more particularly the vehicle axle.

Other objects and features of this invention will more fully become apparent in view of the following detailed description taken in conjunction with the accompanying drawing illustrating therein a single embodiment and in which:

Figure 1 is a side elevation of my wheel structure;

Figure 2 is an enlarged fragmentary cross-sectional view taken substantially on the line II—II of Figure 1 looking in the direction indicated by the arrows; and Figure 3 is an enlarged front elevation of an inner cap member.

As shown on the drawings:

The reference numeral 10 generally indicates my wheel structure which includes a body part 11 suitably fastened by means of welding and the like at 12 to a multi-flanged drop center type tire rim 13. The tire rim 13 includes an intermediate axial flange 14 and is junctioned at 15 with outer tire rim margin 16. Carried upon the tire rim is a conventional pneumatic tire assembly 17 which may be either of the tube or tubeless type and which is adapted to be inflated by inserting air into valve stem 18a shown in Fig. 1.

The body part 11 lends itself to being attached to a vehicle wheel since a centrally located generally radially extending flange 18 is provided with circumferentially space apertures 19 through which lugs on a vehicle wheel axle may be telescoped at which time nuts may be threaded onto the ends of the lugs to clamp the body part 11 to the wheel axle in a conventional manner. Radially inwardly and centrally of the axial flange 18 is provided a central opening 20 which is defined by a generally goose neck shaped flange 21. The flange 21 has a camming surface 22, a retaining shoulder 23 and a seat 24 the purposes of which all will be hereafter discussed in further detail.

Carried upon the vehicle wheel is my cover structure 25 which includes an inner cover member or cap member 26 and an outer cover member 27.

The outer cover member may be made from any suitable materials such as stainless steel, aluminum, and other suitable materials. The inner cover member 26 also lends itself to being made from a number of different materials such as those aforementioned and preferably a resilient material.

The cap member 26 has an enlarged head 28 which is connected at circumferentially spaced intervals to axially inwardly extending irregularly curved resiliently deflectable retaining extensions 29. For purposes of augmenting the resiliency of extensions 29 the enlarged head portion 28 is notched out at circumferentially spaced intervals between the extensions 29 with the notches being defined by curved edge areas indicated at 30. The curvature of the extensions 29 is somewhat similar to an S-shaped configuration since the extension has an S-shaped extension portion defined by a radially outwardly bulged portion 31 joined at one end with the head portion 28 and has a second radially inwardly bulged portion 32 joined at the other end. The radially inwardly bulged portion 32 is joined at its axially inner terminal to an axially inwardly extending portion or wheel engaging terminal 33 which includes an underturned bead or reverse-bent terminal 34 having an edge 35 for gripping engagement behind the shoulder 23.

To assemble the cap member 26 upon the wheel, the extensions 29 are generally axially aligned with respect to the camming surface 22 on the flange 21 and thereafter upon the application of an axially inward force the extension edges 35 are progressively cammed over the camming surface 22 into retaining engagement behind the shoulder 23. It will be seen in Figure 2 that when the cap member is in assembly upon the wheel, the terminal portion of the extensions 29 is in bottomed backed up engagement with the seat 24.

The outer cover member 27 includes an enlarged generally axially outwardly extending head portion 36 which is adapted to overlie and receive therein the head portion 28 of the inner cover member 26. Connected to the enlarged central crown portion 36 is a generally radially outwardly elongated intermediate deflectable cover portion 37 which terminates in cover margin 38. The junction of the portions 37 and 38 is provided with an annular axially outwardly dished portion 39 which, when the cover is in assembly upon the wheel, is adapted to bottomingly engage against tire rim juncture 15.

Interlocked on the head portion 28 of the cap 26 is a nut 40. The cover portion 28a is engaged in the nut slot 40a. The nut 40 is adapted to cooperate with a bolt 41 which is lodged in a recessed portion 42 of the central crown 36 of the outer cover member 27.

After the inner cap member 26 has been assembled onto the body part 11 in the manner described above, the outer cover member 27 is centered with respect to the cap member 26 and bottomed against the tire rim at 15. The bolt 41 is then inserted through the cover opening and threadedly engaged with the nut 40 on the inner cap member with the inner and outer cover members being drawn towards one another as a result of progressively rotating and threading the bolt into the nut. This action causes the intermediate radial cover portion 37 of the outer cover member to be placed under resilient tension in a manner which holds the outer cover member under tension against the tire rim at 15.

As a result of the aforementioned cooperation between the cover assembly and the wheel, unauthorized removal of the cover assembly may be discouraged since removal of the cover may not be effected by inserting a pry-off underneath the outer cover margin of the outer cover member without substantially damaging the cover assembly. Hence, if a suitable locking device is employed with the bolt element 41, the cover assembly may not be removed from the wheel except by the holder of the key.

It will be understood that modifications and variations may be effected without departing from the scope of the novel concepts of the present invention.

I claim as my invention:

1. In a wheel structure, a wheel including a one-piece body part having a central opening defined by an axially outwardly turned body flange provided with shoulder structure, a sheet metal cap member including a head portion, the head portion having circumferentially spaced resiliently deflectable retaining extensions disposed about the periphery of the head portion in self-retaining cooperation with the shoulder structure provided on the body part, the head portion having a central opening defined by a head flange, a nut provided with a peripheral slot and with the head flange engaged in the peripheral slot to maintain the nut and the cap member in unitary assembly, a wheel cover member in overlying relation with respect to the wheel having a portion bottomed against the wheel, the cover member having an outer cover margin disposed radially outwardly and adjacent to the portion bottomed against the wheel, and a bolt extended through the cover member and in threaded assembly with the nut, the action of the nut and bolt being such as to cause the area of the cover member disposed radially inwardly of the cover portion bottomed against the wheel to be deflected axially inwardly to place the cover portion bottomed against the wheel under resilient tension to insure rattle free bottomed engagement of the cover portion against the wheel and with the outer cover margin remaining relatively stationary.

2. The wheel structure of claim 1 further characterized by the body part having a series of circumferentially spaced lug openings disposed radially outwardly of the shoulder structure, said resiliently deflectable retaining extensions having extension portions engaged with said shoulder structure and with said extension portions being disposed radially inwardly of the lug openings to provide free access to the lug openings so that the wheel may be removed from a vehicle axle without first removing the cap member from the wheel.

3. In a wheel structure, a wheel including rim and body parts with the body part secured at its outer margin to the rim part and having a central axle opening defined by an axial body part flange and with the flange provided with shoulder means, a cover structure including axially inner and outer cover members, the inner cover member having a series of circumferentially spaced resiliently deflectable retaining extensions arranged in a circle having a diameter slightly at variance with the diameter of the shoulder means permitting the inner cover member to be snapped into assembly with the body part, the inner cover member having a nut secured in assembly therewith, the outer cover member having a cover area bottomed against the wheel, and a bolt extended through the outer cover member in threaded assembly with the nut maintaining the outer cover member bottomed against the wheel.

4. In a wheel structure including a wheel having rim and body parts with the body part having an axle opening defined by an axial body flange having a retaining shoulder on its radially outer side, a sheet metal cap member including a head portion, the head portion having circumferentially spaced resiliently deflectable retaining extensions disposed about the periphery of the head portion for self retaining cooperation with the retaining shoulder provided on the body part, the head portion having a nut secured thereto, and an outer cover member overlying the tire rim and bottomed against the tire rim, the outer cover member carrying a screw cooperable with the nut to secure the cap member and the outer cover member in assembly, each of said extensions including an S-shaped portion and a resiliently deflectable reverse-bent wheel-engaging terminal, the S-shaped extension portion being disposed between the wheel engaging terminal and the head portion to reinforce each of the extensions, the reverse bent terminals being engageable in snap-on, pry-off engagement with the retaining shoulder.

5. The wheel structure of claim 4 further characterized by each of the reverse bent terminals being engageable against the body part axially rearward of the retaining shoulder to resist accidental disassembly of the cap member relative to the body part, the S-shaped portion including a radially inwardly bulged portion and a radially outwardly bulged portion and with the reverse-bent wheel engaging terminal being disposed radially inwardly of the bottom of the radially outwardly bulged portion.

6. The wheel structure of claim 5 further characterized by the bottom of the radially inwardly bulged portion being disposed axially inwardly of the radially outwardly bulged portion and radially inwardly of the wheel engaging terminal.

7. In a wheel structure, a wheel including rim and body parts having a centrally positioned annular shoulder, a cover structure including a circular sheet metal axially inner cover member and an axially outer cover member with the outer cover member axially overlying said inner cover member, said circular sheet metal axially inner cover member having circumferentially spaced resiliently deflectable extensions for retaining cooperation with said annular shoulder, and a detachable fastener between said inner and outer cover member to mtaintain said outer cover member in assembly with said inner cover member and on the wheel, said outer cover member having a marginal portion in bottomed engagement against the wheel prior to assembly of said cover members so that when said fastener is drawn in intermediate portion of said axially outer cover member is resiliently deflected axially inwardly maintaining the marginal portion under tension against the wheel to prevent the outer cover member from rattling.

References Cited in the file of this patent

UNITED STATES PATENTS

| 1,320,551 | Holley | Nov. 4, 1919 |
| 2,249,568 | Shinliver | July 15, 1941 |
| 2,386,245 | Lyon | Oct. 9, 1945 |
| 2,483,055 | Krasberg | Sept. 27, 1949 |
| 2,550,222 | Carlin | Apr. 24, 1951 |

FOREIGN PATENTS

| 13,647 | Great Britain | 1914 |
| 492,840 | Great Britain | Sept. 28, 1938 |